UNITED STATES PATENT OFFICE.

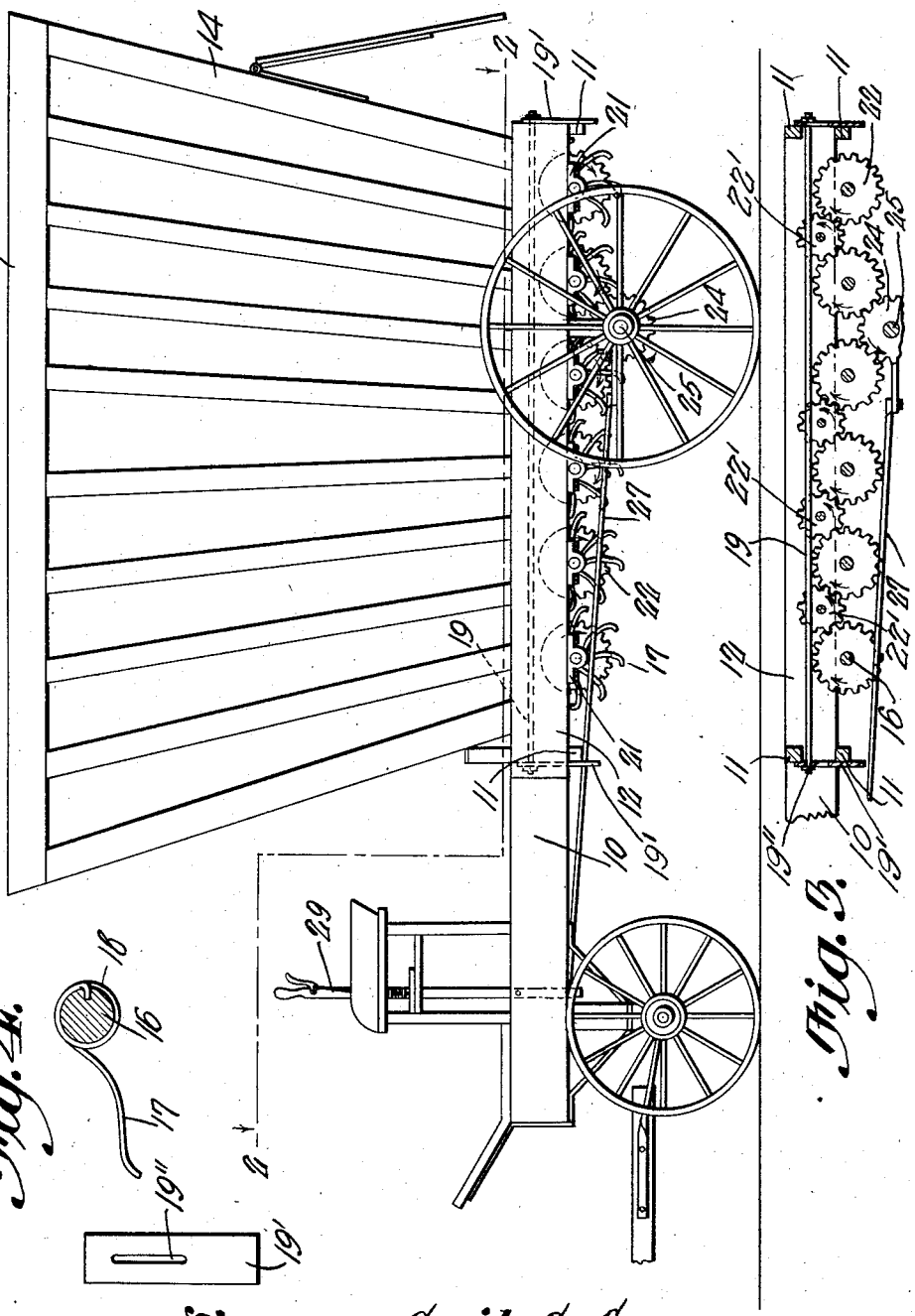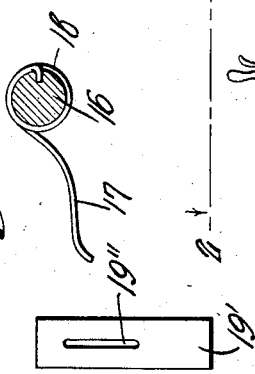

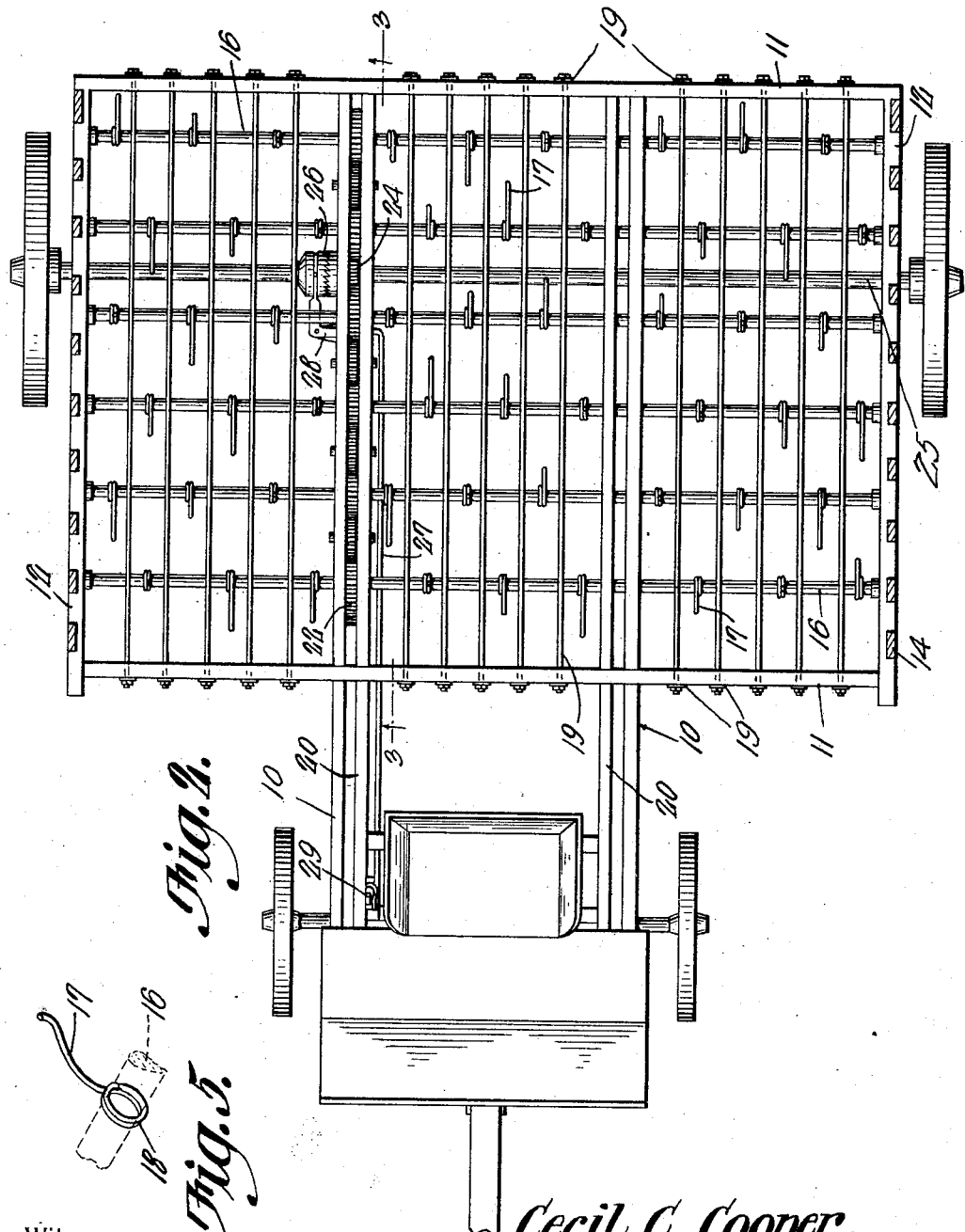

CECIL C. COOPER, OF McPHERSON, KANSAS.

STRAW-SPREADER.

1,054,828.  Specification of Letters Patent.  Patented Mar. 4, 1913.

Application filed July 6, 1912. Serial No. 708,079.

*To all whom it may concern:*

Be it known that I, CECIL C. COOPER, a citizen of the United States, residing at McPherson, in the county of McPherson and State of Kansas, have invented a new and useful Straw-Spreader, of which the following is a specification.

This invention relates to improvements in straw spreaders.

The primary object of the invention is to provide a straw spreader which will deliver at the bottom, and insure an even distribution of the straw, and in which the distributing members, are driven by the axle of the vehicle upon which the straw rack is supported.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without in the scope of what is claimed without departing from the spirit of the invention.

In the drawings—Figure 1 is a side elevation. Fig. 2 is a top plan view, Fig. 3 is a section taken on the line 3—3 of Fig. 2, Fig. 4 is a section through one of the shafts showing one of the spring teeth in side elevation, and Fig. 5 is a detailed view of one of said spring teeth, a shaft being shown in dotted lines. Fig. 6 is a front elevation of one of the slotted plates employed for holding a straw supporting rod.

Referring to the figures by characters of reference 10 and 20 designate parallel side beams arranged in pairs and constituting the frame of the machine. Extending transversely of these beams and bearing upon the upper and lower edges thereof, are front and rear cross beams 11 to the outer ends of which are secured the sides 12 of the straw rack. Standards 14 extend upwardly from these sides and the upper ends of these standards are connected by bars 15. As shown in the drawings the length of the beams 11 is much greater than the distance between the beams 10 and, therefore, the distributing mechanism is provided which, while capable of turning within a small area, distributes over a comparatively large area.

Supported by the sides 12 are parallel transversely extending shafts 16 each of which has spring fingers 17 extending therefrom, the inner terminals of the fingers being coiled about the shafts. The fingers are arranged in staggered relation, as shown particularly in Fig. 2. Rods 19 are arranged parallel with the beams 10 and 20 and connect the cross beams 11, these rods serving to maintain the beams 11 in proper relation to each other. The rods do not extend through any of the beams 11 but, instead, project, at their ends, through plates 19′, the slots 19″ in these plates constituting means for receiving the rods. Nuts are mounted on the ends of the rods and bear against the plates 19′ so as thus to bind said plates tightly against the beams 11. These plates can be held by frictional contact in engagement with the beams 11 or, if desired, can be secured to said beams in any suitable manner, as by means of screws or the like. It will be apparent that by loosening the nuts on the rods 19, said rods can be adjusted vertically within the slots 19″. Furthermore when the rods are thus loosened, the plates 19′ likewise become loosened and it is therefore possible to adjust said plates and the rods toward or from each other and thus diminish or increase the width of the spaces between the rods. In this manner the discharge of straw from the machine may be regulated.

The beams 10 and 20 are provided with bearings 21 which support a plurality of gears 22. All of these gears 22 mesh with idler gears 22′ and two of the gears 22 are engaged by a drive gear 24 which is loosely mounted on the shaft 25 of the vehicle. This gear may be locked to its shaft by means of a clutch 26 and any desired means may be employed for actuating the clutch. In the drawings a bell crank lever 28 is shown in engagement with the clutch and this lever is connected by a rod 27 to an actuating lever 29 located at a point within convenient reach of the driver of the machine.

It will be apparent that when the machine moves forward motion will be transmitted from the shaft 25 to the train of gears provided the clutch is in active position. Thus the various shafts 16 will be rotated in the same direction and cause the spring fingers 17 to travel between the rods 19. As the straw rests upon the rods, the spring fingers will engage it and pull it downwardly therebetween so as thus to distribute the straw in the manner desired.

As the shafts 16 extend over an area much greater than the distance between the beams 10, it will be seen that the area covered by the distributer is greatly in excess of that which can be covered by an ordinary wagon. Furthermore it will be seen that the device can be constructed cheaply and that the various parts thereof can be easily assembled.

What is claimed is:—

1. A straw spreader comprising a rack having sides and ends, a frame supporting the rack, rods extending longitudinally within the rack and adjustable upwardly and downwardly independently of each other, transverse shafts, means for rotating the shafts simultaneously, and fingers movable with the shafts and between the rods, said rods constituting the bottom of the rack.

2. A straw spreader comprising a wheel supported frame, a rack mounted thereon and including side and end beams, parallel rods arranged longitudinally within the rack and separately adjustable upwardly and downwardly, transverse shafts carried by the rack, means operated by the supporting wheels for rotating the shafts simultaneously, and spring fingers extending from the shafts and movable between the rods, said rods constituting the bottom of the rack.

In testimony that I claim the foregoing as my own, I have hereto affixed my signature in the presence of two witnesses.

CECIL C. COOPER.

Witnesses:
  CHAS. A. PURDY,
  J. R. LANSING.

---

Copies of this patent may be obtained for five cents each, by addressing the "Commissioner of Patents, Washington, D. C."